(12) United States Patent
Marias Albrich

(10) Patent No.: US 11,420,813 B2
(45) Date of Patent: Aug. 23, 2022

(54) BAG SUITABLE FOR PACKAGING HORTICULTURAL PRODUCTS AND A METHOD AND MEANS FOR THE PRODUCTION THEREOF

(71) Applicant: Girnet Internacional, S.L., Badalona (ES)

(72) Inventor: Luis Miguel Marias Albrich, Badalona (ES)

(73) Assignee: Girnet Internacional, S.L., Badalona (ES)

( * ) Notice: Subject to any disclaimer, the term of this patent is extended or adjusted under 35 U.S.C. 154(b) by 322 days.

(21) Appl. No.: 16/378,012

(22) Filed: Apr. 8, 2019

(65) Prior Publication Data
US 2019/0308801 A1 Oct. 10, 2019

(30) Foreign Application Priority Data
Apr. 9, 2018 (EP) .................................. 18382243

(51) Int. Cl.
*B65D 85/34* (2006.01)
*B65D 30/06* (2006.01)
(Continued)

(52) U.S. Cl.
CPC .......... *B65D 85/345* (2013.01); *B31B 70/003* (2017.08); *B31B 70/18* (2017.08);
(Continued)

(58) Field of Classification Search
CPC ..... B65D 85/345; B31B 70/18; B31B 70/003; B29C 66/8511; B29C 2031/7128
(Continued)

(56) References Cited

U.S. PATENT DOCUMENTS

| | | | |
|---|---|---|---|
| 2,040,559 A | * | 5/1936 | Luttrell ................. D06F 95/004 383/22 |
| 4,795,268 A | * | 1/1989 | Jorda ..................... B65D 29/04 383/117 |

(Continued)

FOREIGN PATENT DOCUMENTS

| | | |
|---|---|---|
| EP | 1 176 104 A2 | 1/2002 |
| EP | 2 006 077 A2 | 12/2008 |

(Continued)

OTHER PUBLICATIONS

European Search Report for EP 18 38 2243 dated Sep. 18, 2018.

*Primary Examiner* — Robert F Long
*Assistant Examiner* — Xavier A Madison
(74) *Attorney, Agent, or Firm* — Sughrue Mion, PLLC

(57) ABSTRACT

A breathable bag (1) especially suitable for packaging horticultural products (2) comprising a mesh casing (3), which is capable of housing the products to be packaged and at least one first band (5) of flexible material applied on the outside of and joined to the casing by affixed areas (6, 7) affixed to said casing, the first band covering a region (8) of the casing that has a hole (9), the practical access to the hole (9) being prevented by the affixed joining areas (6, 7) between the first band (5) and the casing (3), and the first band (5) being equipped with at least one tear line (10) that determines in the first band (5) a removable portion (5*c*) from the casing (3) that is sufficient to leave uncovered or to open a practical access to said opening (9).

20 Claims, 7 Drawing Sheets

(51) Int. Cl.
  *B65D 81/26* (2006.01)
  *B31B 70/00* (2017.01)
  *B31B 70/18* (2017.01)
  *B31B 70/81* (2017.01)
  *B29C 65/02* (2006.01)
  *B29C 65/74* (2006.01)
  *B29C 65/00* (2006.01)
  *B29L 31/00* (2006.01)
  *B65D 33/06* (2006.01)
  *B29C 63/02* (2006.01)

(52) U.S. Cl.
  CPC .......... *B31B 70/812* (2017.08); *B65D 29/04* (2013.01); *B65D 81/263* (2013.01); *B29C 63/02* (2013.01); *B29C 65/02* (2013.01); *B29C 65/745* (2013.01); *B29C 66/73921* (2013.01); *B29C 66/8511* (2013.01); *B29L 2031/7128* (2013.01); *B65D 33/06* (2013.01); *B65D 85/34* (2013.01)

(58) Field of Classification Search
  USPC .......................................... 493/309
  See application file for complete search history.

(56) References Cited

U.S. PATENT DOCUMENTS

| | | | |
|---|---|---|---|
| 5,741,076 A * | 4/1998 | Cammack | B65D 29/04 206/554 |
| 6,506,429 B1 * | 1/2003 | Recchia, Jr. | B29C 65/18 426/106 |
| 6,976,786 B1 * | 12/2005 | Stanley, Jr. | A45C 9/00 383/117 |
| 7,356,979 B2 * | 4/2008 | Pannekeet | B65B 9/213 53/389.2 |
| 7,931,064 B2 * | 4/2011 | Liang | B29C 65/5057 156/499 |
| 9,561,882 B2 * | 2/2017 | Fox | B65D 33/01 |
| 2001/0049924 A1 * | 12/2001 | Dauder Guardiola | B65B 9/13 53/567 |
| 2004/0032992 A1 * | 2/2004 | Hershku | B65D 33/14 383/9 |
| 2004/0238128 A1 * | 12/2004 | Giro Amigo | B65B 51/146 156/494 |
| 2008/0056622 A1 * | 3/2008 | Austreng | B65D 33/1691 383/5 |
| 2009/0181193 A1 * | 7/2009 | Giro Amigo | B65B 61/06 428/35.2 |
| 2011/0147383 A1 * | 6/2011 | Soudais | B32B 27/32 220/270 |
| 2012/0275729 A1 * | 11/2012 | Liang | B29C 65/524 383/72 |
| 2012/0321229 A1 * | 12/2012 | Surdziel | B65D 33/20 383/207 |
| 2014/0105523 A1 | 4/2014 | Bazbaz | |
| 2015/0052857 A1 * | 2/2015 | Hefner | B65B 9/2035 53/551 |
| 2015/0266644 A1 * | 9/2015 | Bazbaz | B32B 27/00 383/201 |
| 2017/0203880 A1 | 7/2017 | Giro Amigo | |
| 2018/0009599 A1 | 1/2018 | Giro Amigo | |

FOREIGN PATENT DOCUMENTS

| | | |
|---|---|---|
| EP | 2 006 082 A2 | 12/2008 |
| EP | 2 078 677 A1 | 7/2009 |
| EP | 2 986 524 A1 | 2/2016 |
| ES | 2 244 907 T3 | 12/2005 |
| WO | 03/011692 A2 | 2/2003 |
| WO | 2007/132440 A1 | 11/2007 |
| WO | 2012/032327 A1 | 3/2012 |
| WO | 2014/011205 A2 | 1/2014 |
| WO | 2014/170774 A1 | 10/2014 |
| WO | 2016/012633 A1 | 1/2016 |

* cited by examiner

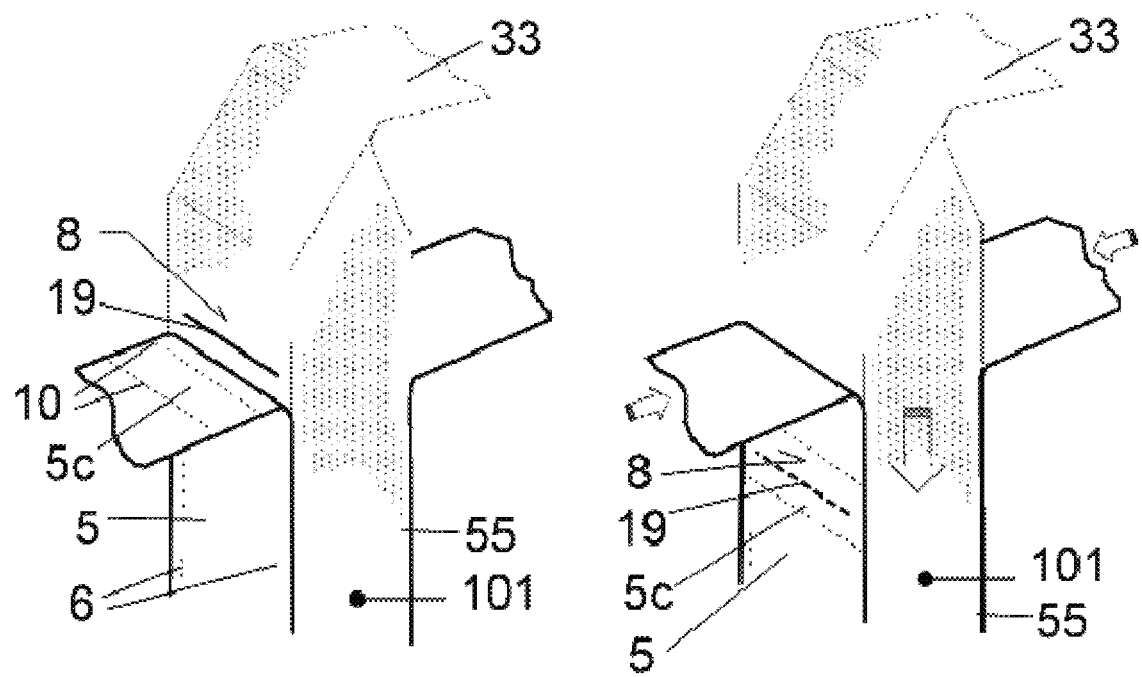
Fig. 7a  Fig. 7b
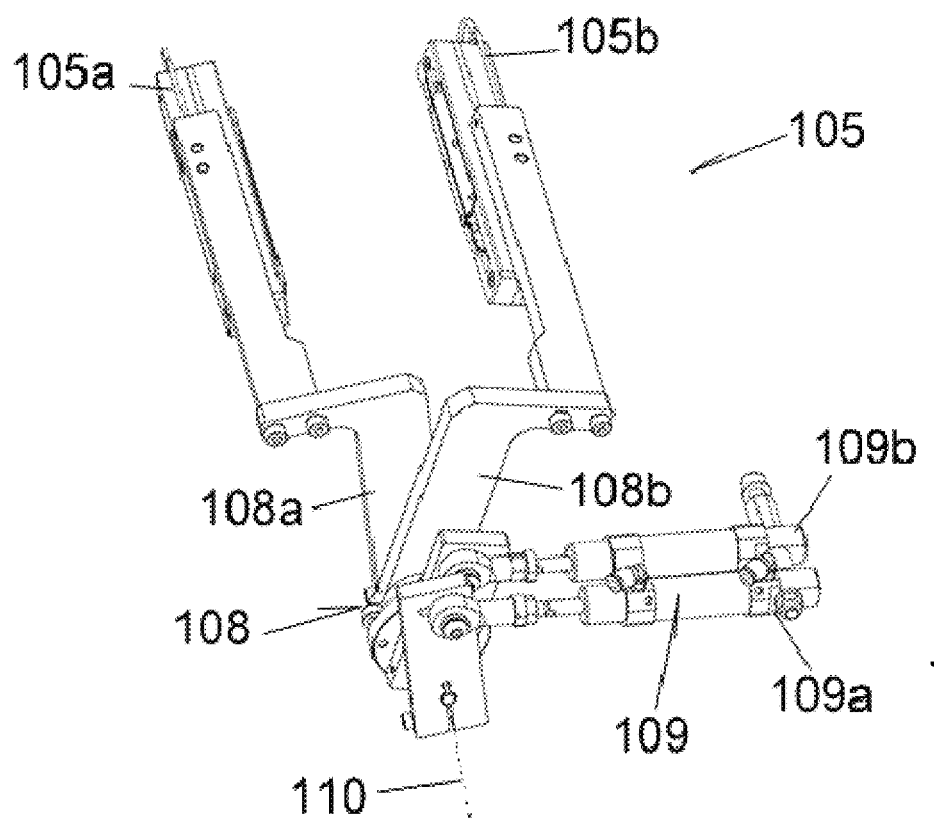
Fig. 9

BAG SUITABLE FOR PACKAGING HORTICULTURAL PRODUCTS AND A METHOD AND MEANS FOR THE PRODUCTION THEREOF

TECHNICAL FIELD OF THE INVENTION

The invention relates to a bag suitable for packaging horticultural products that combines a mesh casing with flexible material, for example, in the form of a band or bands. The invention also relates to a method for producing said bag from a continuous tubular mesh and to a station of a product manufacturing and packaging machine to implement said method.

BACKGROUND OF THE INVENTION

Currently, various types of mesh bag that combine a mesh casing with a flexible material, in the form of a band, which is affixed to the mesh, are known. This flexible material has practical functions in the creation of packagings, such as closure functions, to provide mechanical performance to the packaging, to provide the packaging with handles, etc. That is, the use of these bands is not exclusively for aesthetic reasons.

The use of a mesh to form the casing means that the packagings produced are especially suitable for packaging horticultural products given the high breathability of the packagings and the mechanical performance that a mesh can provide. Naturally, packagings with the same characteristics can be used to store other types of products. In both cases, the ability provided by these packagings to the see the contents thereof is also valued.

More commonly, the packagings consist of a tubular mesh portion, whether produced as such or by joining the opposite edges of an originally flat mesh, inside of which the products to be stored are placed and which is closed at the ends thereof to confine said products. Materials suitable for these meshes are plastic and fibre composites or various combinations and the meshes can be woven or produced by extrusion. Examples are described in the patent documents EP2006077 and WO2016012633.

Conventionally, the closure of the tubular mesh is carried out by gathering and joining together the walls thereof. Usually, the closure of the tubular mesh coincides with a portion of the tubular mesh that has the aforementioned flexible material in the form of a band attached on two opposite faces to thus reinforce the closure and prevent the mesh from tearing at this point. More specifically, the portions of this flexible material in the form of a band are joined with the interposition of the mesh. This join can be carried out by thermal welding, by providing heat, or by radio frequency, by sewing, by gluing or other forms. Materials suitable for this purpose are plastic materials and, more recently, cellulose-based compostable materials. The bands can have a simple or laminar constitution, for example, by combining layers of different material to provide the bands with certain properties on the inner faces thereof intended to face the mesh, such as a certain melting temperature, which is not required on the outer faces thereof, which are visible to users, or vice versa. One example is described in the patent document EP2006082.

When these bands that aid in closing the packaging are extended from one end of the packaging to the other, said bands can contribute to, among other aspects, supporting the weight of the full packaging when it is grasped and transported suspended or to facilitate the grasping of the packaging.

Patent documents EP1176104; EP2986524; WO03011692; EP2078677; and US2018009599 describe variants of packagings, production methods and devices suitable for manufacturing and filling the packagings of this type from a supply of continuous tubular mesh and at least one band of flexible material applied outside the tubular mesh.

As with any packaging intended to contain consumer products, although it is desirable for the opening of these mesh packagings to be a practical operation, this cannot be to the detriment of the safety that the packaging must provide. That is, the packaging must not accidentally open during the storage, distribution and presentation thereof.

The use of mesh as a base material provides some advantages in this regard as very resistant materials can be used, although the greater the resistance provided by the mesh against ripping, the harder it is for the user to open the packaging since, upon completely packaging the products with the mesh, the opening necessarily entails ripping the mesh. On the other hand, however, the mesh provides the packaging with good tamper evidence since making an opening an in the tubular mesh by ripping is not a reversible operation, there then is a clear indication that the product may have been accessed if the mesh is ripped.

Patent document ES 2244907 describes a solution for providing a packaging with the aforementioned characteristics with means to facilitate the opening thereof. In this proposal, a closed end of the packaging comprising the packet of material formed by two portions of bands welded together with interposition of the flattened tubular mesh is provided with a cut starting at one edge of said end. The cut enables a manual tearing action that enables the opening of the packaging. Despite this advantage, the accumulation of material does not prevent this tearing, of both the material forming the bands and the mesh, from being difficult, depending on the materials used, whilst being uncontrolled, the tear being able to extend to one side of the tubular mesh and preventing the potential continued use of the packaging.

An objective of the present invention is to disclose an alternative to the solution proposed in ES 2244907.

An objective of the present invention is also a packaging prepared so that the opening operation is more practical, easy to carry out, while more controlled, such that it provides the possibility that the packaging retains the packaging condition and can continue to be used for transporting the products contained. It goes without saying that all this must be achieved without compromising the performance of the packaging, ensuring that it does not accidentally open and continues to provide clear tamper evidence.

An objective of the present invention is also an opening solution that is compatible with the machines and methods usually used to produce and package the products in the mesh packagings, particularly produced from a supply of continuous tubular mesh.

The implementation of these methods requires, in a first manufacturing phase carried out in a station of a machine, stretching said mesh from a continuous but flat tubular mesh storage, expanding it in a device with the help of an expansion core arranged floating inside the mesh tube. As it passes through the expansion core, the band or bands of flexible material are applied on the outside of the mesh and affixed to the same in order to then carry out, downstream in the same operation, a transverse cut and sealing of the packet formed by the tubular mesh and the band or bands, the closed bottom of the bag during the manufacture and individualisation of the continuous tubular mesh forming a bag that is open at the top but with the bottom already closed in the previous work cycle of the station. In subsequent manufacturing phases, the individualised bags are filled and closed at the top.

DESCRIPTION OF THE INVENTION

The bag that is proposed is a breathable bag especially suitable for packaging horticultural products comprising a mesh casing, which is capable of housing the products to be packaged, and at least one first sheet of flexible material applied on the outside of and joined to the casing by affixed areas affixed to said casing, the first sheet covering a region of the casing. The bag is essentially characterised in that in the region covered by the sheet, the mesh casing has an opening, in that the practical access to the opening is prevented by the affixed areas joining the sheet and the casing, and in that the sheet is equipped with at least one tear line that determines in the sheet a removable portion, that is, that can be removed or separated from the casing, sufficient to leave uncovered or to open a practical access to said opening.

In the removable portion of the sheet there may or may not be affixed areas affixed to the casing. In a variant of the invention, in the removable portion of the sheet, there are affixed areas affixed to the casing, but these are manually detachable from the casing, for example, during an opening operation of the bag.

As described in detail below, the effort required to detach the sheet from the casing, especially in its affixed areas affixed to the casing, can be graded depending on the extension, shape or type of these affixed areas. Likewise, the design of the tear line or lines with which the sheet is equipped can also contribute if they cross over with one or several affixed areas of the sheet affixed to the casing, it being possible for this tear line or lines to be intermittent and said intermittences being made to coincide or not with the affixed area or areas.

In a variant of the invention, the mesh casing has a tubular configuration that is flattened at the ends thereof determining a first and second face; and the bag comprises the aforementioned sheet, in the form of a first band, and a second sheet, in the form of a second band, each band arranged on an associated face of the casing and joined together at the ends thereof, with interposition of the flattened ends of the casing, such that they ensure the closure of said casing, the affixed areas of the first band affixed to the casing being arranged close to both edges of the first band, a central strip being determined in the first band, the opening being made in the region thereof overlapping the casing.

Therefore, the invention envisages that the sheet, for example in the form of a band, plays a structural function of the bag, in addition to covering the mesh casing.

In an embodiment of this variant, at least on tear line transversally crosses the first band.

Likewise, the first band can also comprise at least two tear lines that transversally cross said first band and that determine between them a removable portion from the casing and that can be separated from the rest of the first band.

In another embodiment, the sheet, in the form of a first band in the case thereof, is equipped with a tear line with an open contour that determines a removable portion, in the form of a flap, from the casing and that remains linked to the rest of the first band by the discontinuity of the tear line.

Said tear line can extend between and up to the affixed areas of the first band affixed to the casing when these affixed areas are arranged close to both edges of the first band.

In this case, in a variant of interest, the tear line comprises a central section that extends to the vicinity of the affixed areas of the sheet arranged close to both edges of the first band; the tear line continuing to both sides of this central section in sections adjacent to the aforementioned affixed area; and ending on both sides with both end sections crossing or touching these affixed areas.

It is envisaged that, on the sheet, in the portion intended to be stretched in order to uncover the opening, a patch is applied secured to the sheet and dimensioned so as to, by way of an auxiliary flap, cover at least one portion of the tear line, and optionally also the area that covers the opening of the casing.

The patch can comprise a tab that is not secured to the sheet in order to be able to be easily grasped to pull the patch and take with it the sheet to cause the tear thereof precisely along the tear line.

According to another characteristic of the invention, the opening consists of a cut made in the tubular casing.

According to another aspect of the invention, a method for producing the aforementioned bags is disclosed, which comprises the operations of a) stretching said mesh from a continuous tubular mesh storage, expanding the perimeter thereof with the help of an expansion core arranged floating inside the tubular mesh; and b) as it passes through the aforementioned expansion core, applying on the outside of the tubular mesh and affixing over a region thereof a sheet of flexible material, the method being characterised in that, before operation b) it comprises the operation of carrying out an opening in the aforementioned region of the tubular mesh such that, as a result of operation b), the sheet covers the opening, and in that the sheet is provided with at least one tear line that determines in the sheet a removable portion sufficient to leave uncovered or to open a practical access to the opening thereof.

In a variant of the method, the sheet is in the form of a first continuous band and in operation b) this first band is applied longitudinally on the tubular mesh and it is affixed to the tubular mesh along the length thereof in two affixing areas close to the edges of the first band, the opening made in the tubular mesh being arranged between said affixing areas.

The invention preferably envisages that the opening is carried out in the tubular mesh by making a cut therein as it passes through the expansion core at a point upstream of operation b).

A preparation station for bags for a bagged product manufacturing and packaging machine from a supply of a continuous tubular mesh and of at least one sheet of flexible material, optionally in the form of a continuous first band, which is applied on the outside and joined to the aforementioned continuous tubular mesh, comprises an expansion core of the continuous tubular mesh, intended to be inserted oriented vertically and floating inside a section of said continuous tubular mesh as it passes through the aforementioned expansion core, support means, on which the aforementioned expansion core rests, although with the interposition of the continuous tubular mesh, without preventing the forward movement thereof, means for joining the sheet on a region of the aforementioned section of the continuous tubular mesh while it is expanded by the expansion core, a device for stretching the packet formed by the continuous tubular mesh with the sheet now joined to said tubular mesh and for arranging it away from the influence of the expansion core, and that consequently enables a new section of the continuous tubular mesh to be arranged in the area of influence of the expansion core, and a closure and cutting device for carrying out a transverse sealing operation and after the same, in the forward direction of the tubular mesh, a transverse cutting device of the aforementioned packet formed by the continuous tubular mesh and the sheet, the station being characterised in that it comprises means for carrying out an opening in the continuous tubular sheet, arranged upstream from the means for joining the sheet to the continuous tubular mesh, precisely in the same region of the continuous tubular mesh on which the sheet is joined, downstream, consequently covering said opening.

In a variant, the means for carrying out the opening comprise a cutting device for the tubular mesh.

Thus, in a variant, the expansion core extends above the level of the means for joining the sheet on the continuous tubular mesh to provide a support prepared to support the tubular mesh and against which a cutting head of the cutting device can act.

The cutting device can be a simple or multiple device so as to make a single cut or several cuts in the different areas of the mesh.

In a variant, the cutting device comprises an articulated mechanism with a first and second arms rotating about a common shaft that move on an essentially vertical plane parallel to the expansion core, wherein each arm has an extension sized to support a respective cutting head, each one facing an opposite side of the expansion core, and an actuator group for simultaneously or individually actuating the first and second arms towards the expansion core, to an operative position, or in the opposite direction, to a standby position in which the forward movement of the continuous tubular mesh is not impeded.

In an embodiment of interest, the cutting head or heads of the cutting device may be heated and cuts the continuous tubular mesh by melting the material constituting the same.

BRIEF DESCRIPTION OF THE DRAWINGS

FIGS. 7a to 7b are both schematic views that show a sequence of operations of a method for producing a bag according to the invention;

FIGS. 9 and 10 show two alternatives for a cutting device with which the station of FIG. 8 can be equipped;

DETAILED DESCRIPTION OF THE INVENTION

Figure 1A:
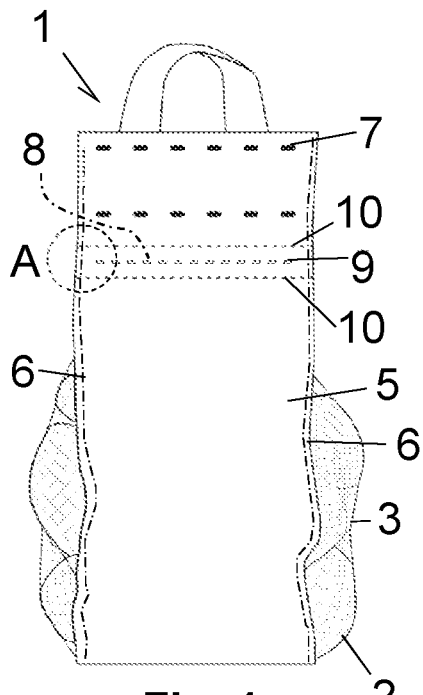
FIGS. 1a, 1b and 1c schematically show a bag according to a variant of the invention according to both front and side views, and another front view, but during an opening operation, respectively.
Figure 1B:
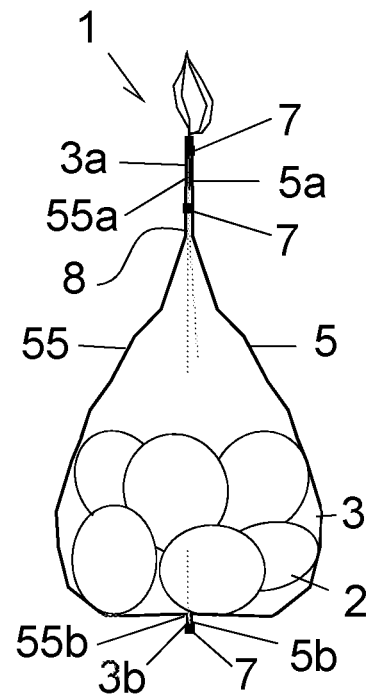

The bag 1 of FIGS. 1a and 1b that exemplifies the invention is of the type comprising, which in itself is known, a casing 3 of extruded or woven mesh with a tubular configuration that is flattened at the ends thereof 3a, 3b determining a first and second faces on which a first flexible sheet is arranged in the form of a first band 5 and a second flexible sheet in the form of a second band 55, both of which are joined together by the upper 5a and 55a and lower 5b and 55b ends thereof, with interposition of the flattened and pleated ends 3a, 3b of the casing 3, such that they provide the closure of said casing 3 determining a body of a bag 1 with a volume suitable for containing a preset amount of product 2. These products can be of any type, although the bag 1 is especially suitable for containing fruits or agricultural products, such as citrus fruits or tubers, due to the breathable properties thereof.

In this example, at the upper end 3a of the casing 3, the first and second bands 5 and 55 are joined to the casing 3 and to each other by means of two affixed areas 7, which are transverse to the bag 1 and slightly separated to form an upper panel that, due to the accumulation of the material constituting the mesh and the bands, is capable of staying upright. In this case, this upper panel is provided with a handle, for example, made of the same material that constitutes the bands, in order to transport the bag 1.

Likewise, at the lower end 3b of the casing 3, the first and second 5 and 55 are joined to the casing and to each other by means of another affixed area 7, which is transverse to the bag 1 that forms a closed bottom of the bag 1.

The first and second bands 5 and 55 do not have to be the same. For example, the first band 5 can have parallel straight edges (as is the case with the example) while the second band 55 can have non-parallel edges, a variable width, etc.

In the bag 1 of FIGS. 1a and 1b, the first band 5 is joined along the length thereof to the casing 3 by affixed areas 6, arranged vertically and close to both edges of the first band 5. The first band 5 not only covers a region 8 of the casing 3 determined between the ends 3a and 3b thereof, but the access to this region 8 of the casing is impeded by the vertical affixed areas 6 and the transverse affixed areas 7. Precisely in this region 8 of the bag 1, the mesh casing 3 has an opening 9. This opening 9 is carried out in the examples by a cut made in the mesh casing 3. This opening 9 is illustrated by a dashed line in FIGS. 1a and 1b as it is covered by the first band 5, and is not visible from the outside of the bag 1.

The second band 55 may or may not be joined along the length thereof to the casing 3. In this regard, it is envisaged that the second band 55 is joined in the same way or a different way than the first band 5 to the casing 3 and it is also envisaged that the second band 55 only remains joined by the upper 55a and lower 55b ends thereof to the casing 3. In this case, the second band 55 can be suitable for carrying out a handle function.

Figure 1C:
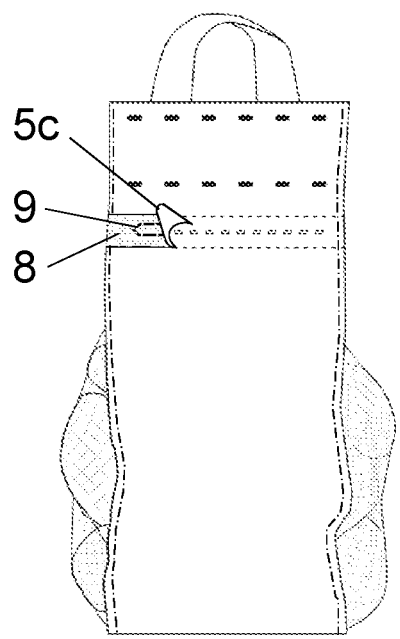

In any case, it is characteristic of the bag 1 of the invention for the first band 5 to be equipped with means for determining therein a removable portion 5c, that is, it can be sufficiently separated from the casing 3 in order to uncover or open a practical access to said opening 9. These means for determining a removable portion 5c in the first band 5 are implemented in the example of FIGS. 1a and 1b by two tear lines 10 with which the first band 5 is provided. More specifically, the first band 5 is provided with two tear lines 10 that are essentially parallel and that extend transversally to the first band 5 from one edge to the opposite edge thereof. These tear lines determine a horizontal strip, coinciding with the opening 9, which can be completely removed, uncovering the opening 9. FIG. 1c shows a moment during an opening operation of the bag 1 during which this removable portion 5a of the first band 5 is detached.

The invention envisages that this removable area 5c may or may not have affixed areas affixed to the casing 3. Taking as an example the bag 1 of FIGS. 1a and 1b, FIGS. 2a and 2b show two different alternatives. In the first case, illustrated in FIG. 2a, there are affixed areas 6a affixed to the casing 3 in the removable portion 5c of the first band 5, these affixed areas 6a being manually detachable from the casing 3. In the second case, illustrated in FIG. 2b, the removable portion 5c lacks affixed areas affixed to the casing 3. In this second case, the separation between the tear lines 10 must be limited to a distance that prevents the practical access to the opening 9. In the context of the present invention, a practical access is not considered to be one that prevents the contained product 2 or products from being removed from the bag 1. If the bag 1 needs to be manipulated in order to break the affixed areas 6 and/or 7 of the first band 5 affixed to the casing 3 in order to extract the products through the opening 9, it is therefore considered that there is not a practical access to said opening 9.

As regards the affixed areas, both the vertical affixed areas 6 and the horizontal affixed areas 7 can be continuous or discontinuous and not necessarily the same in all places. For example, it is envisaged that if there are affixed areas 6a on the removable portion 5c of the first band 5, these are weaker than other vertical affixed joining areas 6 between the first band 5 and the casing 3.

The affixed areas 6, 7 can be carried out by thermal welding, by providing heat, or by radio frequency, by sewing, by gluing or other forms.

Figure 2A:
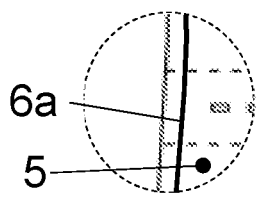
FIGS. 2a to 2d show detailed images of the area marked with a circle in FIG. 1a to illustrate both finishing alternatives for a bag according to the invention.
Figure 2B:
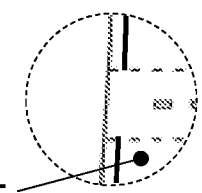

In the case of the example of FIG. 2a, tests carried out have yielded satisfactory results, the mesh casing 3 being made of polyethylene (PE) material, woven in diamond shape with an original raffia size of 1.9 mm wide and 62.5 μm thick, with variable volume, suitably selected to house a horticultural product weight of between 500 g and 2500 g, combined with a first and second bands 5a, 5b of laminated PP/PE (polypropylene/polyethylene) material with a thickness of 80 μm, a solution being used to affix the same to the casing 3 based on thermal welding by providing heat through a castellated welder with a separation of the castellations of 12.5 mm and with a contact surface of each castellation of 6.5×12.5 mm, applying them at a temperature of 170° C. In this case, the affixed areas 6 provided sufficient resistance so that the first band 5a carries out the resistant role thereof and contributes to the bag 1 withstanding the weight of the contained product whilst not impeding the affixed area 6a coinciding with the removable portion 5 from being manually detachable from the casing 3 during the opening operation of the bag. In this implementation, the width of the first band 5a was 145 mm; the separation between the tear lines 10 was 20 mm; and the length of the opening 9 was 95 mm.

As regards the tear lines 10, these can easily be formed in the sheet, if necessary in the form of a band, by means of conventional techniques. For example, they can be formed by areas that have been weakened or subjected to tension during the process for producing the sheet, whether or not in the form of a band, or that have been subsequently worked or machined. Compatible forms are dotted lines or perforated lines the depth of which can vary depending on the material from which the sheet is made and the thickness thereof in order to control the resistance to tearing that these lines provide.

Figure 2C:
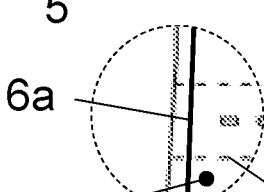
Figure 2D:
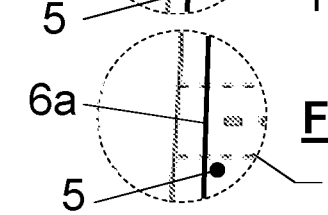

Using the bag 1 of FIGS. 1a and 1b as an example again, FIGS. 2c and 2d show another two different alternatives. In both cases, there are affixed areas 6a affixed to the casing 3 in the removable portion 5c of the first band 5, these affixed areas 6a being manually detachable from the casing 3. These examples serve to illustrate different relationships that can be envisaged between the tear line or lines 10 and these affixed areas 6a. In the example of FIG. 2c, the tear lines 10, which are intermittent, do not coincide with the affixed area 6a: that is, the tear lines 10 are interrupted when they coincide with the intersection thereof with the affixed area 6a. In the example of FIG. 2d, the tear lines 10, which are also intermittent, coincide with the affixed area 6a: that is, there are machined, perforated or weakened areas that form, in the first band 5a, the tear lines 10 that coincide with the intersection thereof with the affixed area 6a.

These and other combinations that are not shown between the affixed area and tear lines are possible, giving rise to different behaviours of the bag during an opening operation depending on the materials chosen, the size of the affixed areas, the nature of the tear lines, etc.

This being said, it is clear that the invention can be implemented with a single tear line 10 or with more tear lines different to those of FIGS. 1a and 1b. Likewise, the opening 9 can also have different shapes and orientations.

Figure 3A:
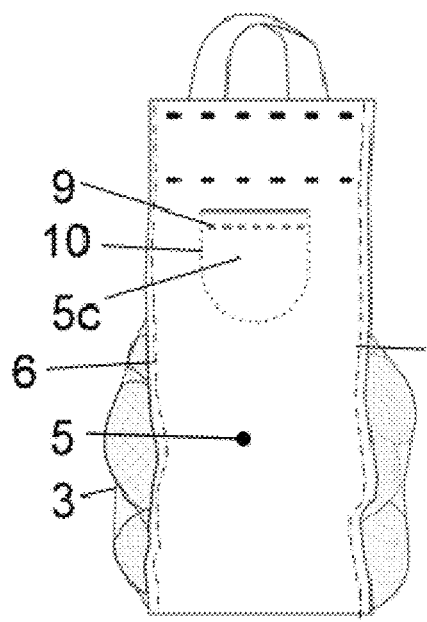
FIGS. 3a and 3b schematically show from the front a bag according to another variant of the invention, closed and during an opening operation respectively.
Figure 3B:
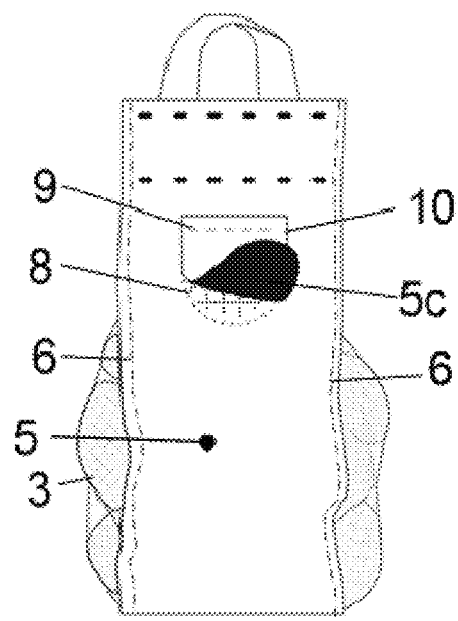
Figure 6:
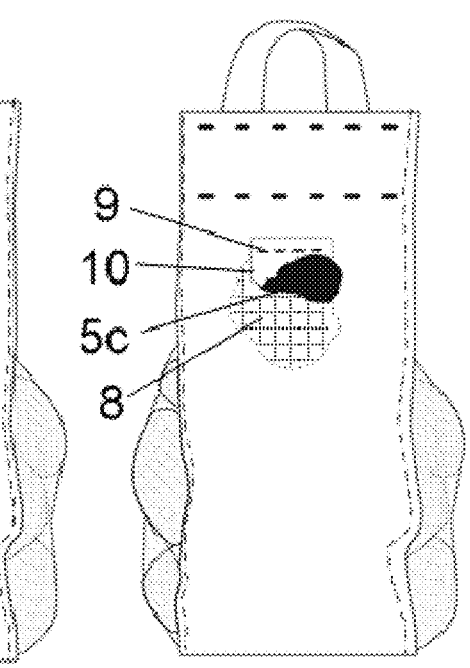

In this regard, FIGS. 3a and 3b show another variant of the invention exemplified in a bag 1 similar to that of FIGS. 1a and 1b but with a single tear line 10 in the first band 5. In this case, the tear line 10 has an open contour and determines a removable portion 5c, which overlaps, from the region 8 of the casing 3 provided with an opening 9. As it is a tear line 10 with an open contour, in this case the removable portion 5c is not completely separated from the rest of the first band 5 during the opening operation of the bag 1. In the example, the opening 9 of the casing is inscribed in the removable portion 5a of the first band 5. FIG. 6 serves to illustrate that the tear line 10 can have shapes other than that illustrated in FIGS. 3a and 3b.

Figure 4:
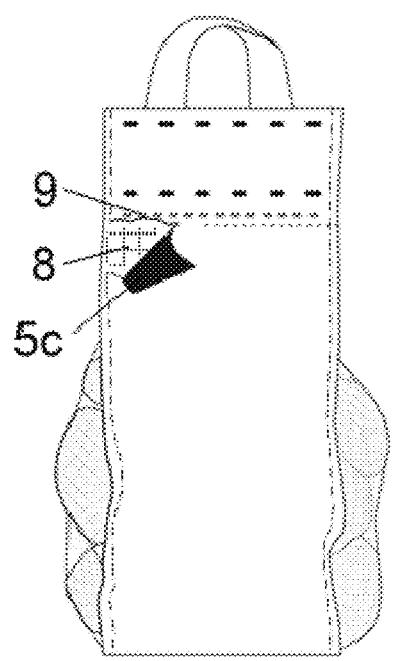
FIGS. 4, 5 and 6 show further variants of a bag according to the invention during an opening operation.
Figure 5:
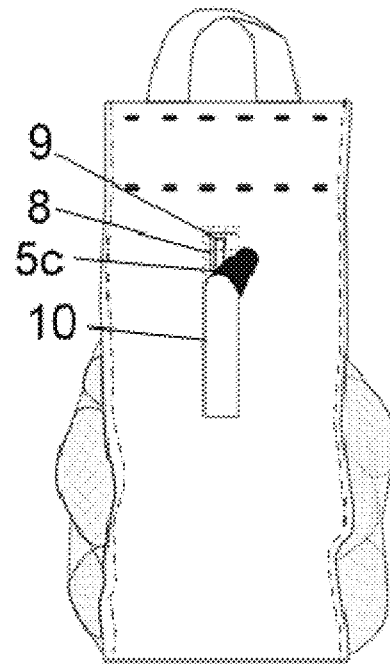

FIGS. 4 and 5 show other variants of the invention.

In the case of FIG. 4, a single tear line 10 extends transverse to the first band 5, from one edge to the other of the first band 5, which enables access to a region 8 of the casing 3 with the opening 9 when the first band 5 is torn. For this purpose, this opening 9 extends close to the tear line 10 and according to a direction essentially parallel to the same.

In the case of FIG. 5, the tear line 10 determines a removable portion 5c by way of a tab that extends essentially vertical to the bag 1 and that uncovers a region 8 of the casing that has an opening 9, which is also vertical, when the first band 5 is ripped by this tear line 10. Indistinctly, the tear line 10 can have a closed contour, the removable portion 5c being able to be completely separated from the rest of the first band 5; or have an open contour, similar to the examples of FIGS. 3*a* and 6.

Figure 14:
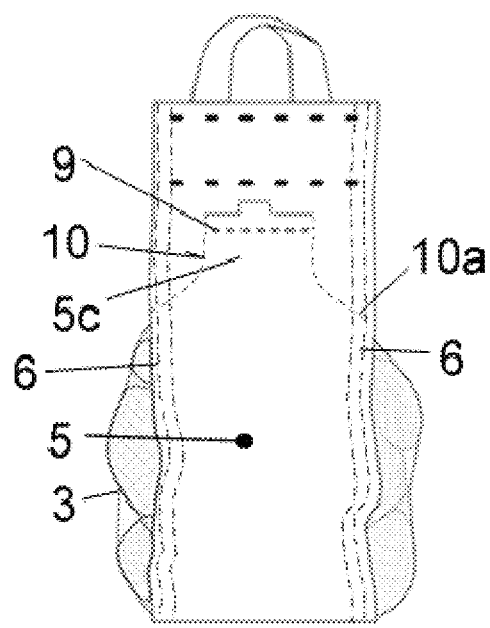
FIG. 14 shows another variant of a bag according to the invention.

FIG. 14 shows another variant of the invention.

In the case of FIG. 14, the tear line 10 has an open contour and determines a removable portion 5*c* in the sheet 5 sufficient to uncover the opening 9, centred and oriented horizontally in the casing 3. In this variant it is of interest that the tear line 10 is extended at the ends 10*a* thereof to reach the affixed areas 6 of the sheet 5 affixed to the casing 3, these affixed areas 6 in the form of vertical seals that extend along the entire length of the bag. This measure prevents an uncontrolled tearing of the sheet 5 when a user pulls it in order to uncover the opening 9.

Figure 15:
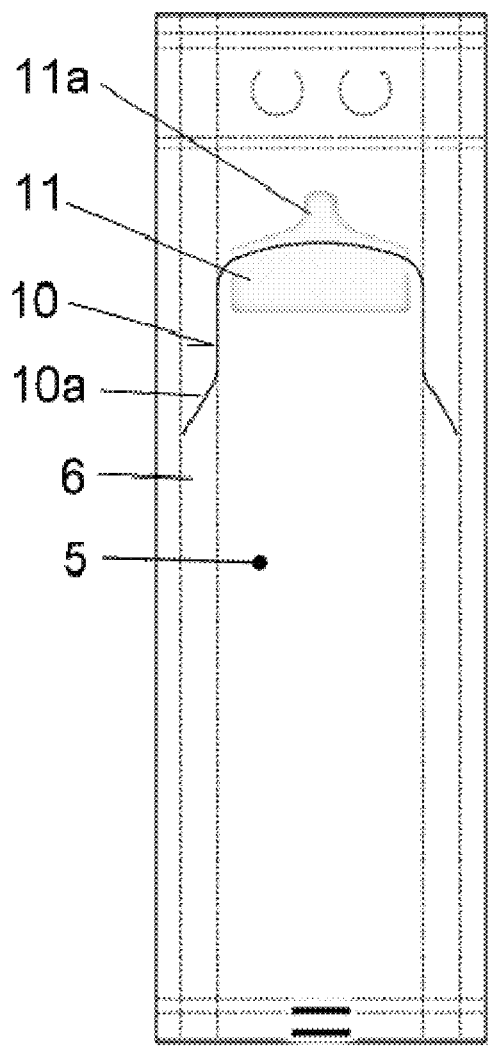
FIG. 15 partially shows another bag according to the invention, specifically to illustrate the relationship between the tear lines made in a sheet and the affixed areas of this same sheet affixed to the casing.

FIG. 15 aims to illustrate this measure using another variant of the invention as an example, having illustrated in this case only the sheet 5 but having identified the affixed areas 6 of the same affixed to the casing 3. In this example, it must be noted, on the one hand, how the tear line 10 comprises a curved central section, in this case convex, which extends to the vicinity of the affixed areas 6, again in the form of vertical seals that extend along the entire length of the bag. The tear line continues vertically on both sides of this central section adjacent to the inner edge of the aforementioned affixed areas 6; and ending at both sides with both end sections 10*a* inclined, coinciding with or crossing the affixed areas 6. This measure also prevents an uncontrolled tearing of the sheet 5 when a user pulls on it to uncover the opening of the casing (hidden in FIG. 15). This measure ensures that the removable portion 5*c* of the sheet 5 does not become completely detached from the rest of the sheet 5.

On the other hand, it must also be noted that the invention envisages applying on the sheet 5, in the portion intended to be stretched in order to uncover the opening 9, a patch 11, for example, an adhesive patch. In this case, the patch 11 is dimensioned so as to, by way of an auxiliary flap, substantially cover the entire central section of the tear line 10 and preferably also the area of the sheet 5 that covers the opening of the casing.

It is envisaged that the patch 11 has a non-adhesive tab 11*a*, or that is not affixed in any other way to the sheet 5, in order to be able to be easily grasped to pull the patch 11 and take with it the sheet 5 to cause the tear thereof precisely along the tear line 10.

In the event of choosing an adhesive join between the patch 11 and the sheet 5, it is possible to equip the bag with a reversible closure. That is, after uncovering the opening in the casing 3, the removable portion 5*c* of the sheet 5 can be rearranged in a position that covers said opening, similar to that which it adopted originally before being torn, by means of the simple operation of reaffixing the patch 11 on the sheet 5, as applied initially.

Figure 8:
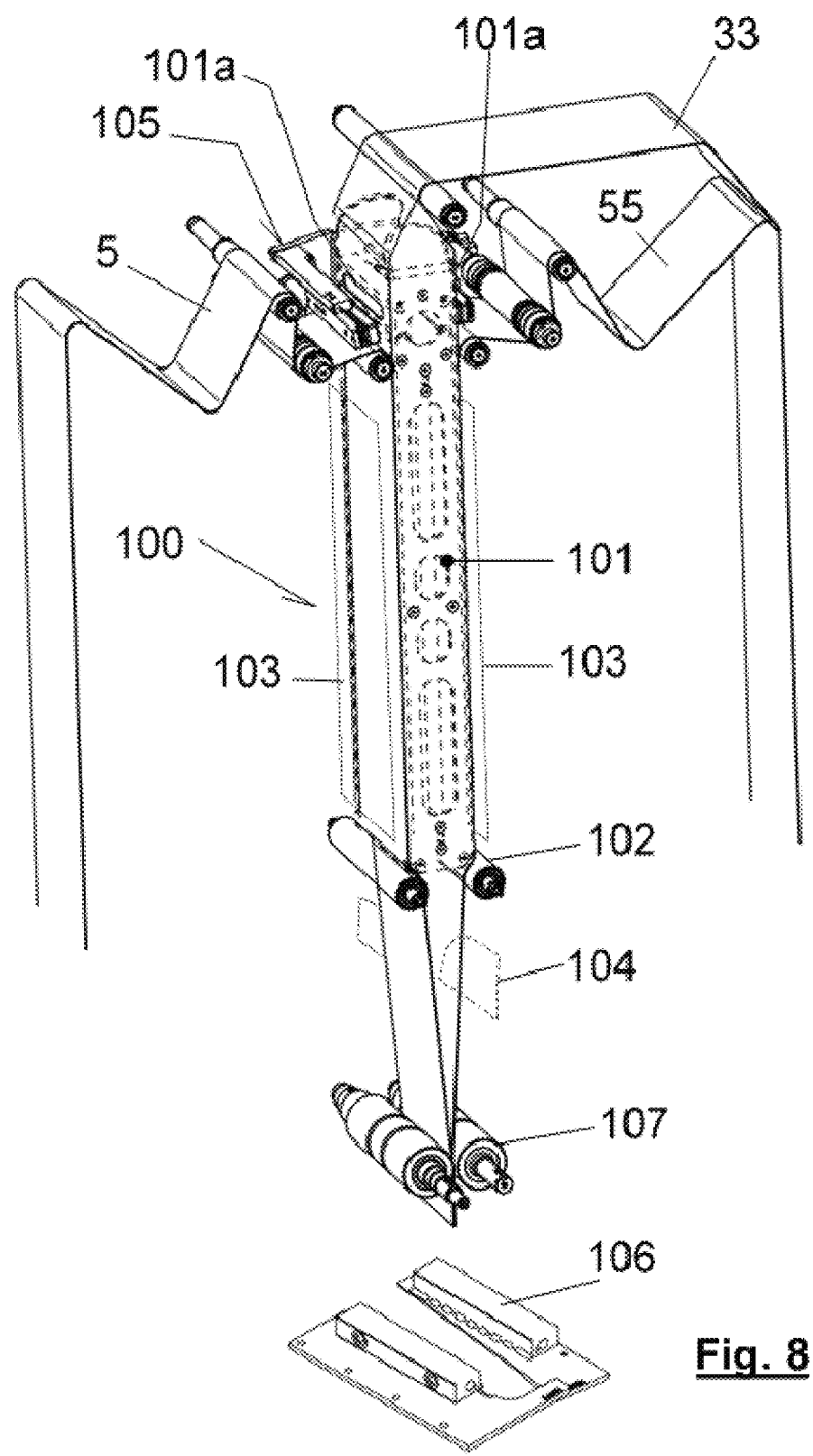
FIG. 8 is a perspective and schematic view of a preparation station for bags of a bag manufacturing and filling machine for implementing the method.

FIGS. 7*a*, 7*b* and 8 schematically show a method and means suitable for producing the bags 1 that exemplify the invention.

Essentially, the method comprises the operation of stretching said mesh from a continuous tubular mesh 33 storage, expanding it with the help of an expansion core 101 arranged floating inside the tubular mesh 33. As it passes through the aforementioned expansion core 101, the method comprises supplying, applying on the outside of the tubular mesh and affixing to the same at least one sheet of flexible material, here in the form of a first band 5, and optionally supply, apply and, if desired, also affix another sheet of flexible material, here in the form of a second band 55, to the tubular mesh 33.

The method according to the invention comprises the added operation of carrying out a cut 19 (see FIGS. 7*a* and 7*b*) in a region 8 of a tubular mesh 33, this region being selected such that downstream the first band 5 of flexible material is applied over the tubular mesh 33 coinciding with said region 8, covering the cut 19, and affixed to the same by affixing areas 6.

Note that for the implementation of these operations, the tubular mesh 33 must be pulled, whether continuously or at intervals, from a point downstream from the expansion core 101. Although there are other points at which the tubular mesh 33 can be stretched, for example at a point located before the expansion core 101, it is still necessary to stretch the tubular mesh at a point after the expansion core. This means that the tubular mesh 33 is subjected to a certain tension at the level of the expansion core 101 when it is stretched from said point located after the expansion core.

Unexpectedly, although the tubular mesh 33 is subjected to tension after the cut 19 is made, the cut does not extend in an uncontrolled way when the tubular mesh 33 is subsequently stretched until the region 8 with the cut is arranged at the level of the expansion core 101 wherein the first band 5 is applied and joined to the tubular mesh 33.

When the tubular mesh 33 is stretched from a point located after the expansion core 101, in practice (as shall be explained with regards to FIG. 8) the packet formed by said mesh and the band or bands 5, 55 of flexible material of which at least the first band 5 is joined to the tubular mesh 33 along the length thereof is stretched. Then, this first band 5 absorbs a portion of the stretching tension, protecting the tubular mesh 33, and specifically the region 8 with the cut 19, from excessive tension that could cause the tubular mesh 33 to ladder, or in other words, an uncontrolled extension of the cut 19 made in the tubular mesh.

This phenomenon enables cuts 19 of different configurations to be made in the tubular mesh 33 before the application thereon of the band or bands of flexible material 5, 55, these cuts 19 being suitable for equipping said tubular mesh 33 with an opening suitable for being subsequently used to open the prepared bag.

Likewise, the first band 5 is selected such that it is provided with one or several tear lines 10 to determine, as explained above, a removable portion 5*c* of the first band 5 in order to uncover or access the cut 19. The application of this first band 5 on the tubular mesh must be effectively coordinated to make this removable portion 5*c* coincide with the region of the tubular mesh 33 where the cut 19 has previously been made.

FIG. 8 schematically shows a preparation station 100 for successive mesh bags that are open at the top in order to implement the method described above.

The station 100 comprises means for supplying the tubular mesh 33 from a continuous roll of flattened tubular mesh (not shown) and from two continuous rolls (not shown) of both first and second bands 5, 55 of flexible material.

The station 100 comprises an expansion core 101, capable of being arranged floating and vertical inside the tubular mesh 33. For this purpose, the station 100 is equipped with support means 102 of the expansion core 101, in the example provided with two rotating rollers, the shafts of which are supported on a fixed component, which is not shown, of the station 100. As is known, the portion of the expansion core 101 that rests on these support means 102 can be provided with corresponding rotating rollers, all of which in such a way that the tubular mesh 33 can slide between the expansion core 101 and the support means 102.

In the example, the expansion core 101 has an essentially rectangular transverse cross section and provides two opposite faces at the level of which means 103 are located for joining the first band and/or second bands 55 on a region 8 of the tubular mesh 33 as it passes through the expansion core 101. In this example, the join is carried out by welding and we refer hereinafter to the welding groups 103.

The aforementioned faces serve to support both welding plates of these welding groups 103 (only illustrated schematically) which are capable of joining, when they are actuated, the tubular mesh 33 as it passes through the expansion core 101 to the first and/or second bands 5, 55 that are supplied and arranged between the aforementioned tubular mesh 33 and these welding groups 103. In this example, both the first and second bands 5, 55 are joined along the length thereof to the tubular mesh 33. This join is achieved by melting the materials that constitute the tubular mesh 33 and at least the faces of the first and second bands 5, 55 facing said tubular mesh 33. One of the welding groups 103 determines, in the future bag, the affixed areas 6 (see FIGS. 1a and 1b) of the first band 5 with the tubular casing 3.

For the implementation of the method described above, in the exemplary station 100, the expansion core 101 extends above the level of supply of the first and second bands 5, 55 to provide both supports 101a and 101b prepared so as for each one to support the tubular mesh 33 and against which a cutting device 105 can actuate.

Figure 10:
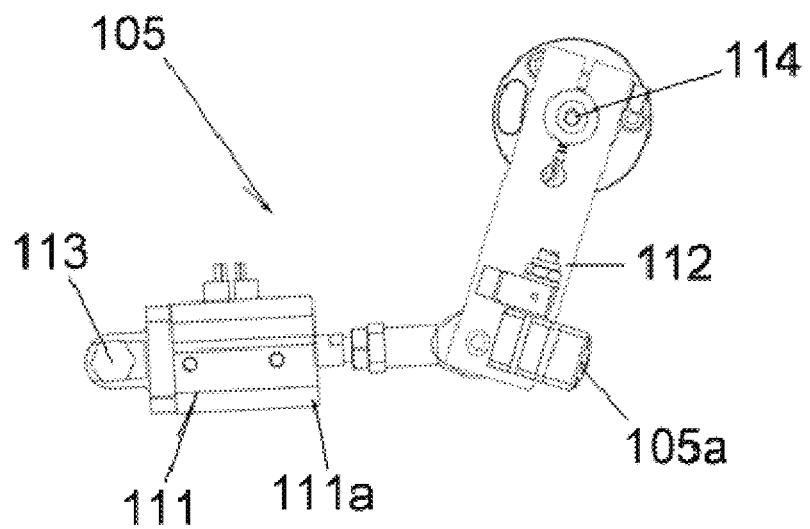

In the example, the cutting device 105 has two cutting heads 105a and 105b, each one facing one side of the tubular mesh 33. A cutting device 105 of this type is represented in FIG. 9. Other options are possible, such as equipping the station 100 with a cutting device 105 with a single cutting head 105a. A cutting device 105 of this type is represented in FIG. 10. The invention even provides other options, such as using a mobile cutting device 105, capable of moving the associated cutting head or heads in the longitudinal direction of the tubular mesh 33, in the same pulling or movement direction of the tubular mesh 33 as it passes through the expansion core 101. According to this alternative, it is not necessary to stop the movement of the tubular mesh 33 in order to make the cut 19.

Returning to the example of FIG. 8, the station 100 is preferably prepared to individually, simultaneously or in coordination operate the two heads 105a and 105b of the cutting device 105. Likewise, the cutting heads 105a and 105b can be the same or different in order to create cuts with a different configuration and/or orientation in the tubular mesh 33. The cutting heads 105a and 105b can be easily replaced or substituted by heads that better meet the characteristics of the band that is to be used in each case to cover a cut 19.

Equipping the station 100 with a cutting device with two cutting heads, one on each side of the expansion core 101 and said cutting head being able to be different, provides the station 100 with greater versatility, being able to prepare different variants of bags without needing to replace the cutting heads.

After the expansion core 101, the station 100 comprises, which in itself is known, a tubular mesh insertion group 104; a device for stretching 107 the packet formed by the tubular mesh 33 and the first and/or second bands 5, 55 of which at least the first band 5 is joined to the tubular mesh 33 along the length thereof; and a closure and cutting device 106 for carrying out a transverse sealing operation and, below the same, a transverse cutting device of the packet formed by the tubular mesh 33 and the band or bands 5 and 55 forming, respectively, the closed bottom of a bag during the manufacture and individualisation of the continuous tubular mesh 33 (and the first and/or second bands if they are also supplied continuously) and a bag that is open at the top but with the bottom already closed during the previous transverse sealing and cutting operation.

In the example, the device for stretching 107 the packet formed by the tubular mesh 33 and the first and/or second bands 5, 55 comprises, which in itself is known, a pair of motorised rollers between which the packet formed by the tubular mesh 33 and the first and/or second bands 5, 55 is arranged, with clamping, that is forced to move forward by friction with the rollers.

The closure and cutting device 106 is in itself known and it is not described in greater detail as it does not form an essential part of the invention. However, it is noted that the transverse welding that this closure and cutting device 106 produces determines, in the future bag, the affixed area 7 of the first band 5 with the casing 3 at the lower end 3b thereof (see FIGS. 1a and 1b).

The produced bag is a bag open at the top, through the open end of which the products can be inserted, in other stations of the same machine in order to subsequently close it at this upper end by bringing the walls of the tubular mesh 33 closer together and making one transverse weld, or several, determining for example the affixed areas 7 at the upper ends 5a and 55a of the first and second bands 5, 55 affixed to each other and with the casing 3 at the lower end 3a (see FIGS. 1a and 1b). Proposals suitable for carrying out these operations are described, by way of example, in the patent documents EP3199461; EP1688351; and EP1481899.

FIG. 9 illustrates an embodiment for the cutting device 105 with which the station 100 can be equipped. This cutting device 105 comprises an articulated mechanism 108 with a first and a second arms 108a and 108b that rotate about a common shaft 110, the cutting device 105 being adjusted during assembly such that this shaft is essentially horizontal and the arms 108a and 108b move on a plane essentially vertical and parallel to the expansion core. Each arm has an extension sized in order to support a respective cutting head 105a and 105b that rests against an associated face of the tubular mesh when the arm that supports it is actuated in the direction that arranges the cutting head against the aforementioned tubular mesh. For this actuation, the cutting device 105 comprises an actuator group 109 that in the example comprises a first and second piston 109a and 109b for the individual or coordinated actuation of the arms 108a and 108b, respectively.

The actuator group 109 is capable of imposing on each arm 108a and 108b a movement between two end positions, of which one is a standby position, in which the associated cutting head 105a or 105b adopts a position separated from the tubular mesh 33 to not impede the forward movement thereof; and the other is an operative position, in which it applies the associated cutting head 105a or 105b against the tubular mesh 33.

The cut in the tubular mesh can be carried out in different ways, such as mechanically, by shearing, or thermally, by melting. In the example, the cutting heads 105a and 105b comprise a nichrome wire that is sufficiently heated, by making an electrical current circulate through the same, to cut the tubular mesh 33 by contact with the nichrome wire.

FIG. 10 illustrates another embodiment for a simple cutting device 105, that is, that a single cutting head 105a is mounted. This variant of the device comprises an arm 112 rotating about a first fixed shaft 114 that when mounted is adjusted to be horizontal. This rotating arm supports the cutting head 105*a*, similar to that of the variant of FIG. 9. The rotating arm 112 is actuated by an actuator 111 that in the example comprises a piston 111*a*, the mobile plunger of which is articulately joined to the rotating arm 112 and the cylinder barrel of which is also articulately joined, in this case, about a second fixed shaft 113, parallel to the first fixed shaft 114. The actuator 111 is capable of moving the arm 112 rotating about the first fixed shaft 114 between two end positions, of which one is a standby position, in which the associated cutting head 105*a* adopts a position separated from the tubular mesh 33 in order to not impede the forward movement thereof; and the other is an operative position, in which it applies the associate cutting head 105*a* against the tubular mesh 33.

Figure 11:
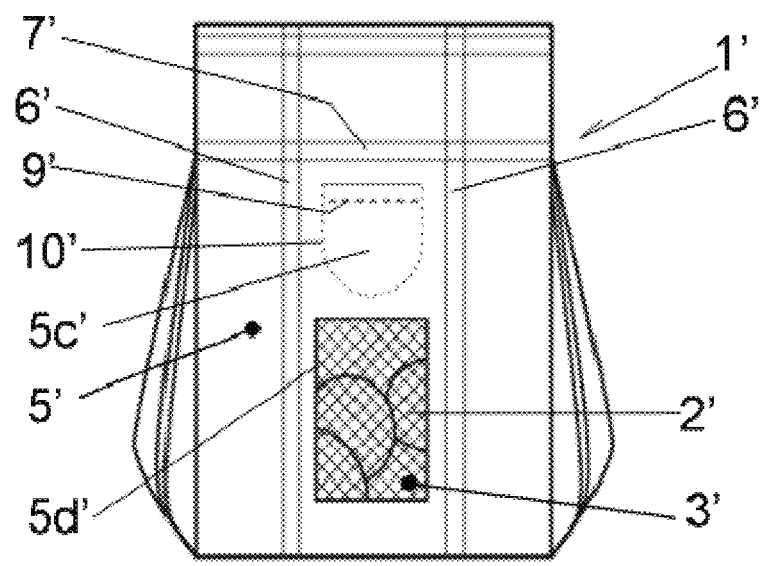
FIG. 11 schematically shows a bag according to another variant of the invention.

The bag 1' of FIG. 11 also exemplifies the invention and serves to illustrate that the technical principle of the invention can be applied to bags that are made differently.

The aforementioned bag 1' is of the type in which the casing 3' can be produced from a longitudinal portion of tubular mesh 33' which is inserted longitudinally in a longitudinal portion of a tubular formation to which a flexible sheet in the form of a band 5' belongs.

The amount of product 2' that the bag 1' contains is confined by carrying out at least a first and second transverse affixed closure areas 7' that link, at the upper and lower ends (see FIG. 13), respectively, of the bag 1', the facing walls of the tubular formation with the interposition of the tubular mesh. These first and second affixed areas 7', oriented horizontally in FIG. 11 (wherein only that of the upper end of the bag 1' is visible), are affixed areas that can be carried out by sewing, gluing, tying, thermal welding, etc.

In this specific example, the band 5' that forms part of the tubular formation has or is equipped with at least one opening 5*d'* that leaves a portion of the casing 3 of the mesh uncovered, through which the product 2' contained in the bag 1' can be seen.

Similarly to the variants described above with regards to the bag 1, in the bag 1' of FIG. 11, the tubular mesh 33' that forms the casing 3' is equipped in a region between the first and second affixed areas 7', between which the product 2' is enclosed, with an opening 9 that is covered by the band 5'. The access to this opening 9 is prevented by the first and second horizontal affixed areas 7' and, in the example, also by the vertical affixed areas 6, which join the band 5' to the casing 3' along the length thereof. Similarly to the example of FIGS. 3*a* and 3*b*, the band 5' is equipped with a tear line 10' that determines in the band 5' a removable portion 5*c'* from the casing 3', which coincides with the opening 9 in order to leave uncovered or to open a practical access to said opening 9.

It is understood that both the shape of the tear line 10 and of the opening 9 and the locations thereof can vary depending on the design of the bag 1'. Likewise, similarly to the variants of the bag 1, it is envisaged that there is more than one tear line 10 and that it or they can have various configurations, similarly to the fact that the affixed areas 6', 7' between the band 5' and the casing 3' can also have various configurations.

Figure 12:
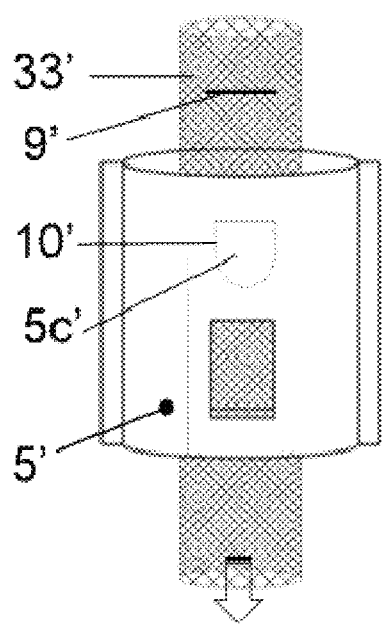
FIGS. 12 and 13 schematically show two stages of a method for producing a bag according to FIG. 11.
Figure 13:
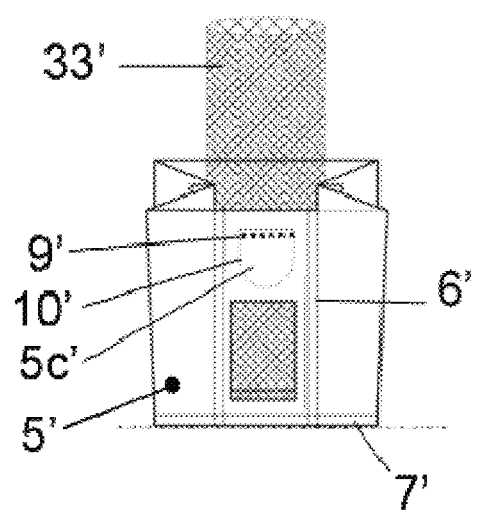

FIGS. 12 and 13 schematically illustrate and only by way of example, two stages of a method for producing a bag 1'. Similarly to the method described with regards to the bag 1, this case also envisages a pulling operation of a portion of continuous tubular mesh 33' from a tubular mesh storage, the opening 9 being made in the mesh in a stage before it is covered and joined by the affixed areas 6', 7' affixed to the tubular formation, specifically and at least by the band 5'.

The invention claimed is:

1. A method for producing a bag (1), wherein the bag comprises:
   a mesh casing (3) configured to house products to be packaged, and
   at least one first sheet (5) of flexible material applied on an outside of and joined to the mesh casing by affixed areas (6, 7) affixed to said mesh casing, the sheet covering a region (8) of the mesh casing located in a lateral portion of the mesh casing,
   wherein, in the region (8) covered by the sheet (5), the mesh casing (3) has an opening (9);
   wherein access to the opening (9) is prevented by the affixed areas (6, 7) joining the sheet (5) and the mesh casing (3);
   wherein the sheet (5) is equipped with at least one tear line (10) that determines in the sheet (5) a removable portion (5*c*) from the mesh casing (3) that is sufficient to leave uncovered or to open an access to said opening (9);
   the method comprising:
   a) stretching tubular mesh from a continuous tubular mesh storage (33), expanding the perimeter thereof with the help of an expansion core (101) arranged floating inside the tubular mesh (33); and
   b) as the tubular mesh passes through the expansion core (101), applying on the outside of the tubular mesh (33) and affixing over the region (8) the sheet (5) of flexible material,
   wherein, before operation b) forming the opening (9) in the lateral portion of the tubular mesh casing in the region (8) of the tubular mesh (33) such that, as a result of operation b), the sheet (5) covers the opening (9), and wherein the sheet (5) is provided with the at least one tear line (10) that determines in the sheet (5) a removable portion (5*c*) from the tubular mesh (33) sufficient to leave uncovered or to open a practical access to the opening (9).

2. The method according to claim 1, wherein there are affixed areas (6*a*) affixed to the casing (3) in the removable portion (5*c*) of the sheet (5), these affixed areas (6*a*) being manually detachable from the casing (3).

3. The method according to claim 1, wherein the mesh casing (3) has a tubular configuration that is flattened at ends (3*a*, 3*b*) thereof determining a first and second face; and wherein the bag comprises the first sheet, in the form of a first band (5), and a second sheet, in the form of a second band (55), each band arranged on an associated face of the casing (3) and joined together at ends thereof (5*a* and 55*a*; 5*b* and 55*b*), with interposition of the flattened ends (3*a*, 3*b*) of the casing to ensure the closure of said casing (3), the affixed areas (6) of the first band (5) affixed to the casing (3) being arranged close to both edges of the first band (5), a central strip being determined in the first band (5), the opening (9) being made in the region (8) thereof overlapping the casing (3).

4. The method according to claim 3, wherein the tear line (10) transversally crosses the first band (5).

5. The method according to claim 4, wherein the first band comprises at least two tear lines that transversally crosses said first band (5) and that determine between them a removable portion (5*c*) from the casing (3) and that can be separated from the rest of the first band (5).

6. The method according to claim 3, wherein the sheet, in the form of the first band (5), is equipped with a tear line (10) with an open contour that determines a removable portion (5*c*), in the form of a flap, from the casing (3) and that remains linked to the rest of the first band (5), and wherein said tear line (10) extends between and to the affixed areas (6) of the first band (5) affixed to the casing (3) arranged close to both edges of the first band (5).

7. The method according to claim 6, wherein the tear line (10) comprises a central section the extends to a vicinity of the affixed areas (6) of the sheet (5) arranged close to both edges of the first band (5); the tear line (10) continuing on both sides of this central section in sections adjacent to the affixed areas (6); and ending at both sides with both end sections (10a) that touch or cross these affixed areas (6).

8. The method according to claim 1, wherein the sheet, in the form of a first band (5), is equipped with the tear line (10) with an open contour that determines a removable portion (5c), in the form of a flap, from the casing (3) and that remains linked to the rest of the first band (5).

9. The method according to claim 1, wherein on the sheet (5), in the portion intended to be stretched in order to uncover the opening (9), a patch (11) is applied secured to the sheet (5) and dimensioned so as to, by way of an auxiliary flap, removably cover at least one portion of the tear line (10).

10. The method according to claim 9, wherein the patch (11) comprises a tab (11a) that is not secured to the sheet (5) in order to be able to be easily grasped to pull the patch (11) and take with the patch the sheet (5) to cause the tear thereof precisely along the tear line (10).

11. The method according to claim 1, wherein the opening (9) consists of a cut made in the tubular mesh (3).

12. The method according to claim 1, wherein the sheet is in the form of a first continuous band (5) and in operation b) the first band (5) is applied longitudinally on the tubular mesh (33) and is affixed to the tubular mesh (33) along the length thereof in two affixing areas (6) close to the edges of the first band (5), and wherein the opening (9) made in the tubular mesh (33) is arranged between said affixed areas (6).

13. The method according to claim 1, wherein the opening (9) is carried out in the tubular mesh (33) by making a cut (19) therein as the tubular mesh passes the expansion core (101) at a point upstream of operation b).

14. The method according to claim 1, comprising:
providing a preparation station (100) for a bagged (1) product manufacturing and packaging machine from the supply of continuous tubular mesh (33) and the at least one first sheet of flexible material in a form of a first band (5), which is applied on the outside and joined to the continuous tubular mesh (33), and that comprises
the expansion core (101) of the continuous tubular mesh (33), intended to be inserted oriented vertically and floating inside a section of said continuous tubular mesh while passing through the expansion core (101),
support means (102), on which the expansion core (101) rests, with interposition of the continuous tubular mesh (33), without preventing a forward movement thereof,
means for joining (103) the sheet (5) on a region (8) of the section of the continuous tubular mesh (33) while expanded by the expansion core (101),
a device for stretching (107) a packet formed by the continuous tubular mesh (33) with the sheet (5) now joined to said tubular mesh (33) and for arranging the packet away from influence of the expansion core (101), and that consequently enables a new section of the continuous tubular mesh (33) to be arranged in the area of influence of the expansion core (101),
a closure and cutting device (106) for carrying out a transverse sealing operation and afterwards, in a forward direction of the tubular mesh (33), a transverse cutting device of the packet formed by the continuous tubular mesh (33) and the sheet (5), and
means for carrying out the opening in the continuous tubular sheet (33), arranged upstream from the means for joining (103) the sheet (5) to the continuous tubular mesh (33), in the region (8) of the continuous tubular mesh (33) on which the sheet (5) is joined, downstream, consequently covering said opening (19).

15. The method according to claim 14, wherein the means for carrying out the opening (19) comprise a cutting device (105) for the tubular mesh (33).

16. The method according to claim 15, wherein the expansion core (101) extends above a level of the means for joining (103) the sheet (5) on the continuous tubular mesh (33) to provide a support (101a) prepared to support the tubular mesh (33) and against which one or more cutting head (105a) of the cutting device (105) can act.

17. The method according to claim 16, wherein the cutting device (105) comprises an articulated mechanism (108) with a first arm and a second arm (108a and 108b) rotating about a common shaft (110) that move on an essentially vertical plane parallel to the expansion core (101), wherein each arm has an extension sized to support a respective one of the one or more cutting heads (105a and 105b), each one facing an opposite side of the expansion core (101), and an actuator group (109) for simultaneously or individually actuating the first arm and second arm (108a and 108b) towards the expansion core (101), to an operative position, or in the opposite direction, to a standby position in which the forward movement of the continuous tubular mesh (33) is not impeded.

18. The method according to claim 16, wherein the one or more cutting heads (105a, 105b) of the cutting device (105) may be heated and cuts the continuous tubular mesh (33) by melting the material constituting the same.

19. The method according to claim 1, wherein the step of forming an opening in the region of the tubular mesh comprises cutting the tubular mesh.

20. The method according to claim 19, wherein the opening is formed in the tubular mesh between closed distal ends of the tubular mesh in the produced bag.

* * * * *